H. M. FRY.
TIRE TREAD.
APPLICATION FILED APR. 6, 1920.
1,390,900. Patented Sept. 13, 1921.
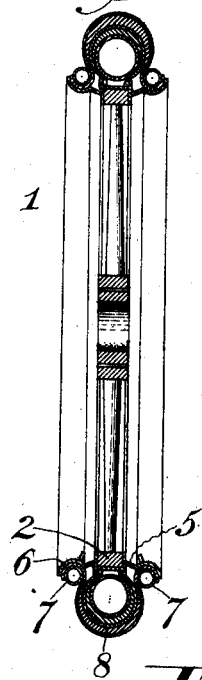
Fig. 1
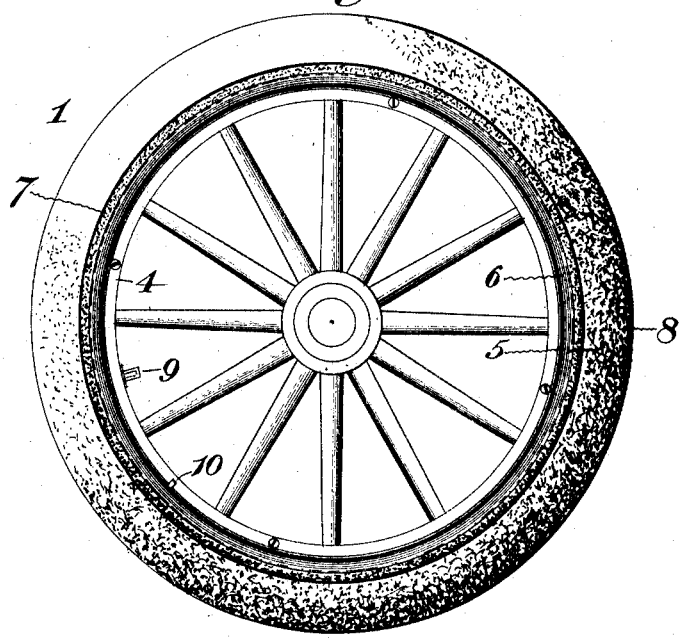
Fig. 2
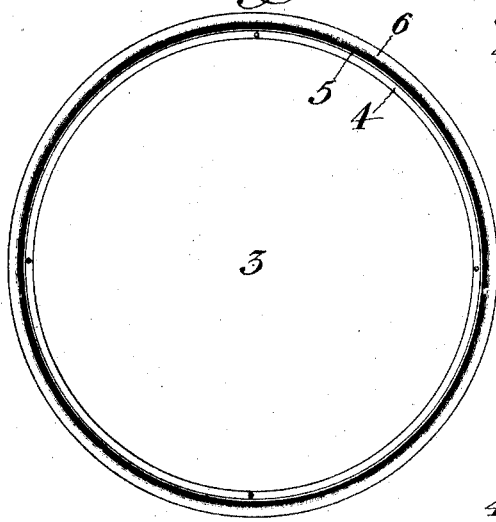
Fig. 3
Fig. 4
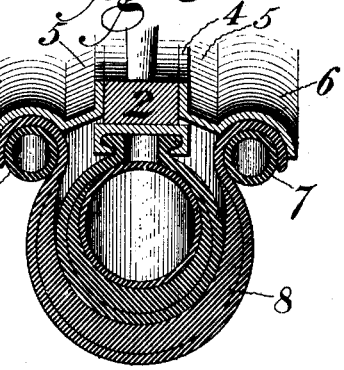
Fig. 5
Fig. 6 Fig. 7
Inventor
Harry M. Fry
By E. E. Overholt
Attorney.

UNITED STATES PATENT OFFICE.

HARRY M. FRY, OF JOHNSTOWN, PENNSYLVANIA.

TIRE-TREAD.

1,390,900.  Specification of Letters Patent.  Patented Sept. 13, 1921.

Application filed April 6, 1920. Serial No. 371,614.

*To all whom it may concern:*

Be it known that I, HARRY M. FRY, a citizen of the United States, residing at Johnstown, in the county of Cambria and State of Pennsylvania, have invented certain new and useful Improvements in Tire-Treads, of which the following is a specification.

My invention relates to means for securing protecting treads on automobile wheels. My object is to provide means which can be easily attached to any automobile wheel whereby a tread made of rubber and fiber may be easily secured on the wheel over a worn shoe to make it last longer, or over a new shoe to protect it.

A leading feature of the invention consists of a pair of detachable steel rims adapted to be secured to the rim of the automobile wheel at opposite sides thereof, and provided with means for carrying a small inflated tube to secure an additional tread on the wheel.

The invention consists in certain novel features of construction and arrangement of parts, as will be hereinafter described and claimed, reference being had to the accompanying drawings, in which:—

Figure 1 is a vertical section of Fig. 2. Fig. 2 is a side elevation of a wheel provided with my improvement. Fig. 3 is a side elevation of one of the securing rims. Fig. 4 is a vertical section of Fig. 3. Fig. 5 is a perspective sectional view on an enlarged scale taken through the lower side of a wheel equipped with my device. Fig. 6 is a broken view illustrating in side elevation, a slightly modified form of detachable steel rim; and, Fig. 7 is a sectional view illustrating the modification shown in Fig. 6.

The numeral 1 indicates an automobile wheel having a felly 2 of ordinary or preferred construction.

Rigidly secured to the felly 2 on either side thereof is a detachable steel rim 3 composed of a vertical section 4 for securing the rim to the felly, an angular section 5 extending outwardly therefrom, and a curved section 6.

The annular sections 6 of the rims are each adapted to receive a small inflated tube 7 with the two side edges of the protecting tread received between said tube 7 and the annular section 6 of the detachable rim, whereby the protecting tread, 8, is securely held on the tire of the wheel.

The steel flange members 3, formed of the sections 4, 5, and 6, are rigidly and detachably secured to the felly 2 in any ordinary or preferred manner, as by bolts, screws, or otherwise.

It is apparent that my device can be attached to any ordinary automobile wheel of suitable diameter to correspond to the diameter of the detachable steel rim.

In operation, when the two side edges of the auxiliary tread 8 are received between the small inflated tubes 7 and the annular sections 6 of the detachable rims, and the tubes 7 are well inflated, the auxiliary tread is securely held in operative position on the wheel; and when the small tubes 7 are deflated, the auxiliary or protecting tread can be easily and conveniently removed from the wheel.

In the modification illustrated in Figs. 6 and 7, I have shown the section 4 of the detachable steel flange member provided with ears 11 having suitable openings for the reception of bolts 12, whereby the flange members may be secured to the wheels by bolting the flange members to each other with the felly of the wheel received between them; thereby requiring no perforation of any kind to be made in the felly of a wheel in order to attach my improvement thereto.

The ears 11 are preferably so arranged that the securing bolts 12 may be made to come at one side of the spokes of the wheel—either at the front or rear, as the case may require—in order to insure the detachable rims against any possibility of creeping on the wheels.

Having now described my invention, what I claim as new and desire to protect by Letters Patent is:—

1. In a device of the character described, the combination with the rim of a wheel and a pneumatic tire secured thereon, of a pair of annular flange members secured at the side thereof and provided with annular channels; a protecting tread received over said tire and provided around its inner edges with annular outwardly curved sections adapted to be received into said annular channels; and a pair of pneumatic securing tires of a diameter when deflated to be received into said channels over said annular outwardly curved sections of the protecting tread, whereby when the securing tires are inflated the inner edges of the protecting tread are clamped between the securing tires and the annular channels, to hold the protecting tread securely on the tire.

2. The combination with the rim of a wheel and a pneumatic tire secured thereon, of a protecting tread secured over said tire and provided around its inner edges with curved sections; and pneumatic clamping means at the sides of the rim for engaging said curved sections of the protecting tread to hold the same on the tire.

3. The combination with the rim of a wheel having means for securing a pneumatic tire thereon, of a pair of annular flange members rigidly and detachably secured at the sides of the rim and spaced from the tire-securing means, said flange members having outwardly-facing annular channels; and pneumatic clamping means carried in said channels and adapted to coöperate therewith to engage and hold the protecting tread on the tire.

4. The combination with the rim of a wheel provided with means for securing a pneumatic tire thereon, of a pair of annular members at the sides of the wheel provided with vertical flanges adapted to engage the sides of the rim and projecting inwardly beyond the inner circumference of the rim and provided in said inwardly projecting portions with alined bores adapted to receive bolts for securing the opposing flanges in rigid relation to each other with the rim clamped between them; said bores being circumferentially spaced from each other a distance equal to the distance apart of the spokes of the wheel, or multiples of said last named distance, whereby said clamping bolts may each be in engagement with a spoke if desired; said annular members being also provided with annular channels; and pneumatic clamping means carried by said channels for detachably securing thereto a protecting tread for the pneumatic tire.

In testimony whereof I affix my signature.

HARRY M. FRY.